United States Patent
Hashimoto et al.

(10) Patent No.: US 8,269,436 B2
(45) Date of Patent: Sep. 18, 2012

(54) MOTOR CONTROL DEVICE

(75) Inventors: Eiichiro Hashimoto, Kyoto (JP); Yoshio Tomigashi, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 840 days.

(21) Appl. No.: 12/407,289

(22) Filed: Mar. 19, 2009

(65) Prior Publication Data
US 2009/0237015 A1   Sep. 24, 2009

(30) Foreign Application Priority Data
Mar. 19, 2008 (JP) ................. 2008-071444

(51) Int. Cl.
*H02P 21/00* (2006.01)
(52) U.S. Cl. ............. 318/400.02; 318/700; 318/400.01; 318/721
(58) Field of Classification Search ............ 318/700, 318/400.01, 400.02, 705, 721
See application file for complete search history.

(56) References Cited

U.S. PATENT DOCUMENTS

| 6,414,462 B2* | 7/2002 | Chong ................ 318/701 |
| 6,822,417 B2* | 11/2004 | Kawaji et al. ............ 318/701 |
| 7,190,130 B2* | 3/2007 | Wogari et al. .......... 318/400.02 |
| 7,348,749 B2* | 3/2008 | Ide et al. ................. 318/599 |
| 7,710,066 B2* | 5/2010 | Hashimoto et al. ......... 318/807 |
| 7,808,203 B2* | 10/2010 | Tomigashi ................ 318/808 |

FOREIGN PATENT DOCUMENTS

JP 2001-25282 1/2001

* cited by examiner

*Primary Examiner* — Walter Benson
*Assistant Examiner* — Thai Dinh
(74) *Attorney, Agent, or Firm* — NDQ&M Watchstone LLP (57) ABSTRACT

To prevent a step-out of a permanent magnet synchronous type motor (1), a motor control device (3a) is provided to include a flux control unit (16) for deriving an excitation current command value ($i_\gamma^*$) according to the rotation speed ($\omega_e$) of the motor, and a voltage shortage determination unit (30) for determining whether or not the supply voltage to the motor is running short based on the excitation current command value ($i_\gamma^*$). When a negative excitation current command value ($i_\gamma^*$) is smaller than a negative determination threshold value, the motor control device determines that the supply voltage is running short and prohibits an increase of the rotation speed or decreases the rotation speed.

9 Claims, 8 Drawing Sheets

FIG. 1

Prior Art

MOTOR CONTROL DEVICE

CROSS REFERENCE TO RELATED APPLICATIONS

This application claims priority based on 35 USC 119 from prior Japanese Patent Application No. P2008-071444 filed on Mar. 19, 2008, the entire contents of which are incorporated herein by reference.

BACKGROUND OF THE INVENTION

1. Field of the Invention

The invention relates to a motor control device for driving and controlling a motor. More specifically, the invention relates to a technology for detecting a shortage of a supply voltage to the motor that causes a step-out or for preventing an occurrence of the step-out.

2. Description of Related Art

Figure 1:
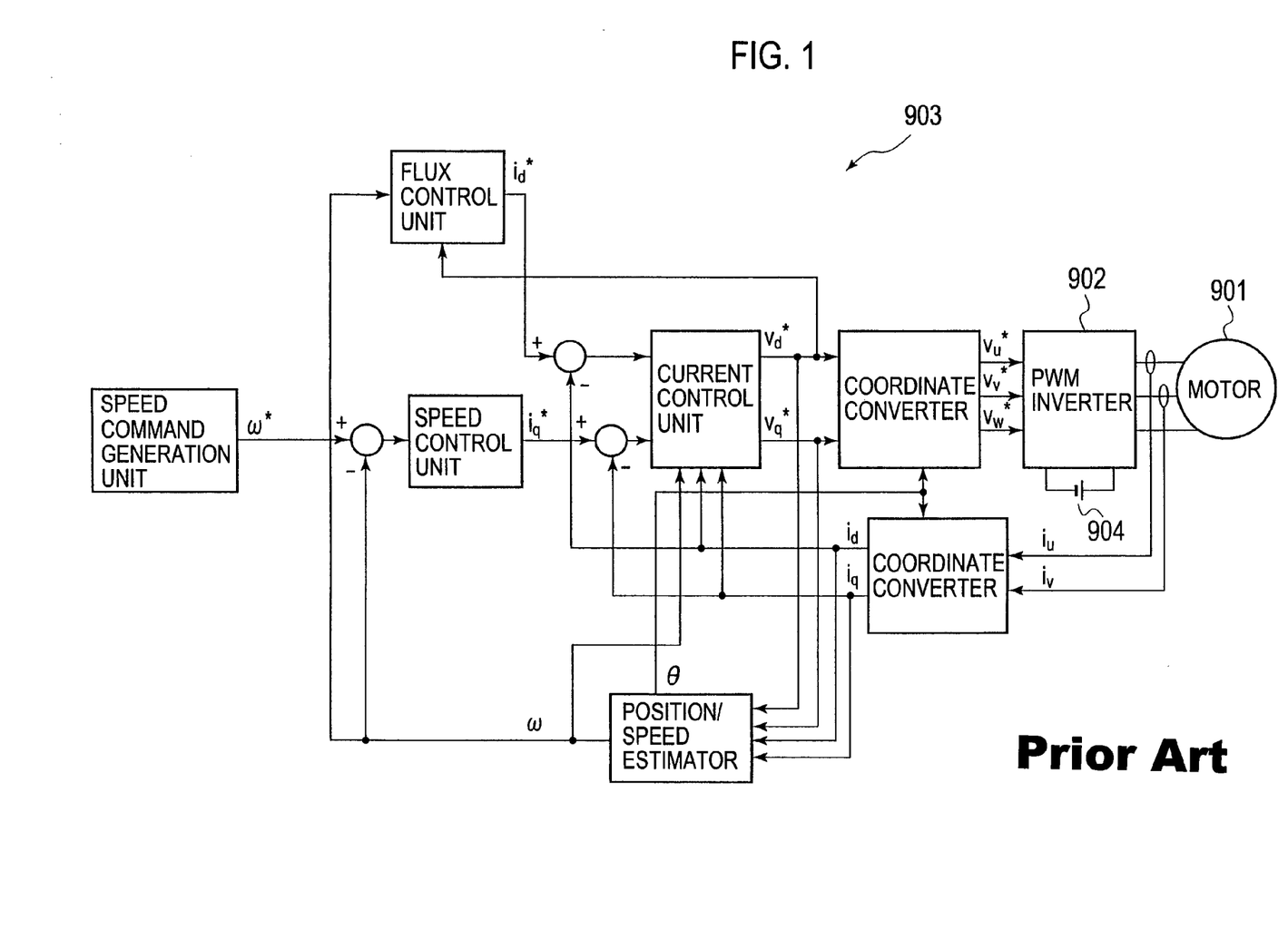
FIG. 1 is a block diagram of a conventional motor drive system.

FIG. 1 shows a block diagram of a conventional motor drive system. The motor drive system of FIG. 1 includes a three-phase permanent magnet synchronous motor 901, a PWM inverter 902, and a motor control device 903. In the motor drive system of FIG. 1, a d-axis current $i_d$ and a q-axis current $i_q$ are computed by a dq conversion of a U-phase current $i_U$ and a V-phase current $i_V$ that are detected by a current sensor. Then, current feedback control is performed such that the d-axis current $i_d$ and the q-axis current $i_q$ follow a d-axis current command value $i_d^*$ and a q-axis current command value $i_q^*$, and three-phase voltage command values ($v_u^*$, $v_v^*$, and $v_w^*$) are generated from a d-axis voltage command value $v_d^*$ and a q-axis voltage command value $v_q^*$ obtained from this feedback control. The q-axis current command value $i_q^*$ is set based on a rotation speed command value $\omega^*$ for specifying the rotation speed of the motor 901. The PWM inverter 902 converts a DC output voltage from a DC power source 904 to a three-phase AC voltage according to the three-phase voltage command values, and vector-controls the motor 901 by supplying the three-phase AC voltage to the motor 901.

The input voltage to the inverter 902, which is an output voltage of the DC power source 904 may fluctuate in actual use. The decrease of the input voltage acts in a direction that the voltage (the voltage the motor 901 requires) to be supplied to the motor 901 from the inverter 902 for driving the motor 901 runs short. Such a shortage of the supply voltage causes a step-out of the motor 901.

The input voltage to the inverter 902 itself usually is monitored by a voltage detector (not shown). However, it is difficult to determine shortages of the supply voltage to the motor 901 from the input voltage information. This is because the voltage required for driving the motor 901 depends on operating conditions that include various elements such as the rotation speed and the torque of the motor 901. Therefore, it is difficult to determine a possibility of the step-out of the motor 901 from the input voltage information.

The increase in the load torque also acts in a direction for the shortage of the supply voltage to occur. This is because when the load torque is increased, a larger motor drive voltage becomes necessary to generate the torque corresponding to the load torque.

Weak magnetic flux control with a negative d-axis current generally is used to prevent a step-out derived from the supply voltage shortage. By performing the weak magnetic flux control, an induced voltage generated within the motor 901 is decreased and the shortage of the supply voltage is resolved or suppressed. However, when the decrease of the input voltage to the inverter 902 or the increase of the load torque is precipitous, such resolution or suppression of the supply voltage shortage by the weak magnetic flux control may be too late due to the control delay and it may result in the step-out.

In recent years, with the reduction in size and weight of motors, the motors are often driven near the threshold within a rated operation range. Although the supply voltage tends to run short at the high-speed rotation range, the rated operation range is expanded to the high-speed rotation range by performing the weak magnetic flux control. In order to achieve the reduction in size and weight as well as the high-speed rotation at the same time, the motor is driven near the voltage limitation especially at the time of performing the weak magnetic flux control, and relatively small decrease in the input voltage or relatively small increase in the load torque causes the supply voltage shortage that causes the step-out.

Several methods have been proposed for detecting an occurrence of this kind of step-out. For example, one conventional method performs detection of the step-out based on a d-axis current detected in a state that the d-axis current command value is made zero (see for example Japanese Patent Laid-Open No. 2001-25282). In another conventional method, the step-out is detected based on a certain physical quantity (such as a correction amount with respect to the rotation speed command) that has a distinctive value at the time of an occurrence of the step-out (see for example Japanese Patent Laid-Open No. 2003-79200). In another conventional method, the d-axis current command value (d-axis current target value) is varied periodically and detection of the step-out is performed based on a q-axis current response at that time (for example, see Japanese Patent Laid-Open No. 2005-151635).

However, the above conventional methods detect an occurrence of the step-out after the step-out has occurred, and cannot detect the shortage of the supply voltage that causes the step-out. In other words, these conventional methods cannot prevent an occurrence of the step-out.

The invention aims to provide a motor control device that contributes to the detection of the supply voltage shortage or prevention of an occurrence of the step-out, and a motor drive system and a compressor utilizing such a motor control device.

SUMMARY OF THE INVENTION

One aspect of the invention is a motor control device that vector-controls a permanent magnet synchronous type motor such that an excitation current component of a motor current supplied to the motor follows an excitation current command value, in which the motor control device includes an excitation current command value derivation unit for deriving the excitation current command value according to rotation speed of the motor, and a determination unit for determining whether or not a supply voltage to the motor for driving the motor is running short based on the excitation current command value. This enables instantaneous detection of the supply voltage shortage, thus making it possible to prevent an occurrence of the step-out effectively.

In particular, the determination unit for example may include a speed command value adjustment unit for adjusting a rotation speed command value the rotation speed is to follow based on a determination result of whether or not the supply voltage to the motor is running short. This enables prevention of an occurrence of the step-out effectively.

Another aspect of the invention is a motor control device that vector-controls a permanent magnet synchronous type motor such that an excitation current component of a motor current supplied to the motor follows an excitation current command value, in which the motor control device includes an excitation current command value derivation unit for deriving the excitation current command value according to rotation speed of the motor, and a speed command value adjustment unit for adjusting a rotation speed command value the rotation speed is to follow based on the excitation current command value. This also makes it possible to prevent an occurrence of the step-out effectively.

In particular, in the above motor control devices, the speed command value adjustment unit may adjust the rotation speed command value based on a comparison result between the excitation current command value and a predetermined determination threshold value.

In particular, in the above motor control devices, the excitation current command value may be classified into one of a plurality of numerical value ranges that do not overlap with each other from the comparison between the excitation current command value and the determination threshold value, and the plurality of numerical value ranges include a normal range and a protective range. When the excitation current command value falls within the protective range, the speed command value adjustment unit adjusts the rotation speed command value such that the rotation speed does not increase or the rotation speed is decreased.

Moreover, in the above motor control devices, the protective range further may be categorized into first and second protective ranges that do not overlap with each other, in which an absolute value of the value that belongs to the second protective range is greater than an absolute value of the value that belongs to the first protective range, and when the excitation current command value falls within the first protective range, the speed command value adjustment unit adjusts the rotation speed command value such that the rotation speed does not increase, whereas when the excitation current command value falls within the second protective range, the speed command value adjustment unit adjusts the rotation speed command value such that the rotation speed is decreased.

In addition, the motor control devices further may include an output unit for outputting a signal in accordance with the comparison result between the excitation current command value and the determination threshold value to an outside of the motor control device.

Another aspect of the invention is a motor drive system having a permanent magnet synchronous type motor, an inverter for driving the motor by supplying a voltage for driving the motor, and one of the above motor control devices that vector-controls the motor through the inverter.

Another aspect of the invention is a compressor that utilizes the torque of the motor provided in the above motor drive system as the drive source.

According to the invention, it is possible to provide a motor control device that contributes to the detection of a supply voltage shortage or the prevention of an occurrence of the step-out, and provide a motor drive system and a compressor utilizing such a motor control device.

BRIEF DESCRIPTION OF THE DRAWINGS

FIG. 11 is applied.

DETAILED DESCRIPTION OF EMBODIMENTS

Next, embodiments of the invention will be described with reference to the accompanying drawings below. In each of the drawings to be referred to, the same or similar reference numbers are assigned to the same or similar parts in the drawings for the embodiments described below and overlapping explanations for the same parts are omitted in principle. The first to the third embodiments will be explained later, but first the matters common to each embodiment or the items being referred to in each embodiment will be explained.

Figure 2:
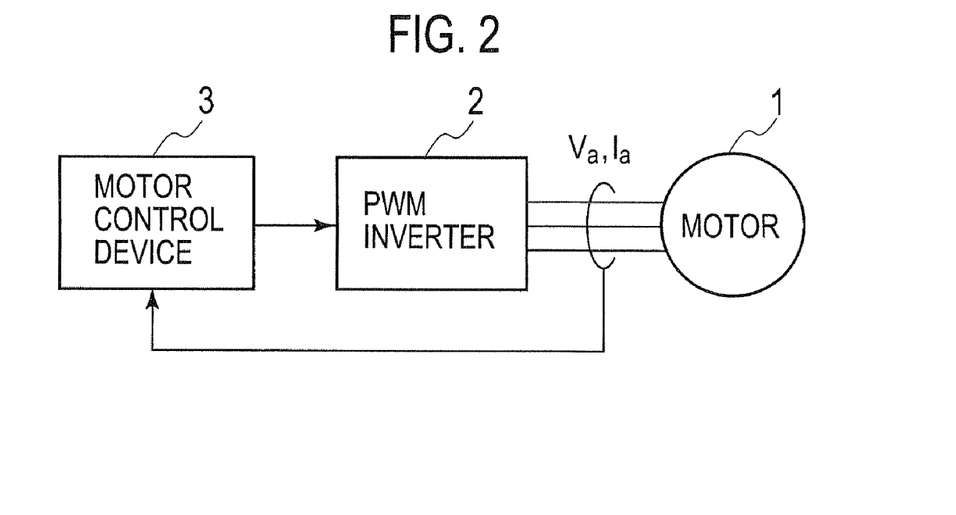
FIG. 2 is a schematic block diagram of a motor drive system according to an embodiment of the invention.

FIG. 2 is a schematic block diagram of a motor drive system according to an embodiment of the invention. The motor drive system of FIG. 2 includes a motor 1, a PWM (Pulse Width Modulation) inverter 2, and a motor control device 3.

The motor 1 is a three-phase permanent magnet synchronous motor and includes a rotor having a permanent magnet (not shown in FIG. 2) and a stator having three-phase armature winding (not shown in FIG. 2). The motor 1 is a salient-pole machine as typified by a synchronous motor with embedded magnets.

The PWM inverter 2, which will be referred to simply as the inverter below, supplies a three-phase AC voltage composed of U-phase, V-phase, and W-phase to the motor 1 depending on the rotor position of the motor 1. The entire voltage applied to the motor 1 will be called a motor voltage (armature voltage) $V_a$, and the entire current supplied from the inverter 2 to the motor 1 will be called a motor current (armature current) $I_a$.

The motor control device 3 controls the motor 1 through the inverter circuit 2 to achieve desired vector control while referring to such as the detected motor current $I_a$.

Figure 3:
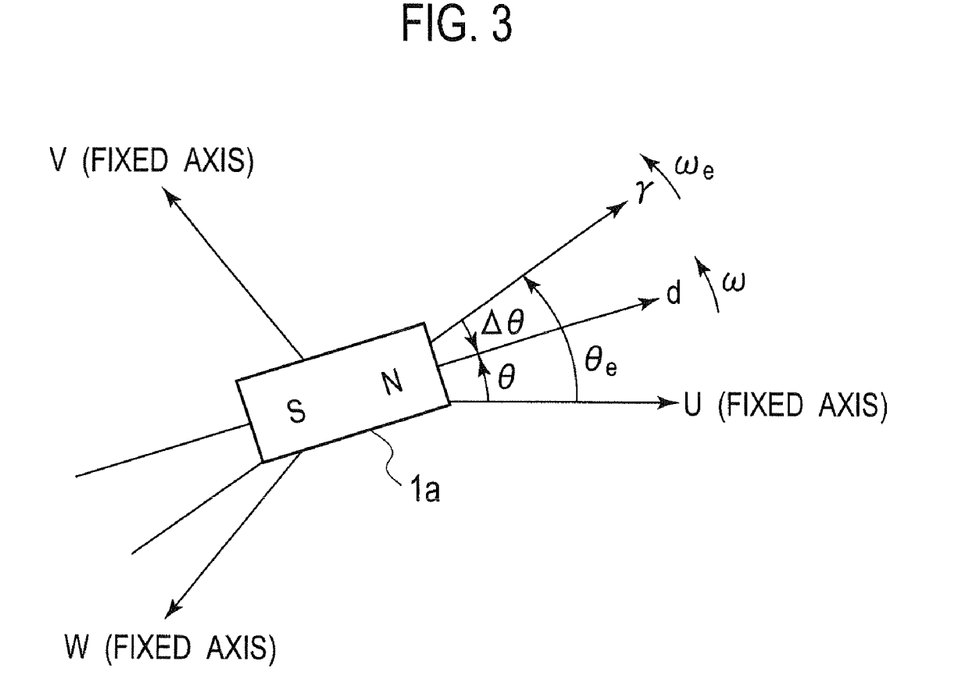
FIG. 3 is an analytical model diagram of the motor as shown in FIG. 2.

FIG. 3 is an analytical model diagram of the motor 1. In the explanation below, the armature winding indicates those provided in the motor 1. In FIG. 3, the U-phase, V-phase, and W-phase fixed axes of the armature winding are shown. The reference number 1a shows a permanent magnet provided to the rotator of the motor 1. In a rotating coordinate system that rotates at the same speed as the rotation speed of the magnetic flux created by the permanent magnet 1a, the direction of the magnetic flux created by the permanent magnet 1a is taken as the d-axis and the rotational axis for control that corresponds to the d-axis is taken as the γ-axis. Further, although not shown, the q-axis is taken at the phase advanced by 90 degrees from the d-axis in an electrical angle, and the δ-axis is taken at the phase advanced by 90 degrees from the γ-axis in an electrical angle. The rotating coordinate system that corresponds to the real axis is a coordinate system in which the d-axis and the q-axis are chosen as the coordinate axes. These coordinate axes and the coordinate system will be called the dq axes and the dq coordinate system. The rotating coordinate system for control is a coordinate system in which the γ-axis and the δ-axis are chosen as the coordinate axes, and these coordinate axes and the coordinate system will be called the γδ axes and the γδ coordinate system.

The d-axis and the q-axis rotate and their rotation speed is expressed as ω. The γ-axis and the δ-axis also rotate and their rotation speed is expressed as $ω_e$. Moreover, in the dq coordinate system, the d-axis angle (phase) viewed from the U-phase armature winding fixed axis is expressed as θ. Similarly, in the γδ coordinate system, the γ-axis angle (phase) viewed from the U-phase armature winding fixed axis is expressed as $θ_e$. The axial error Δθ between the d-axis and the γ-axis is expressed by $θ−θ_e$. The angles expressed by θ and $θ_e$ are the angles in the electrical angle and these are generally called rotor position or position of a magnetic pole. The rotation speed expressed by ω and $ω_e$ is angular speed in the electrical angle.

The state quantity expressed by θ and $θ_e$ will be called the rotor position and the state quantity expressed by ω and $ω_e$ will be called rotation speed below. The state quantity also may be read as the physical quantity. When the rotor position and the rotation speed are derived by estimation, the γ-axis and the δ-axis may be called estimation axes for control.

Figure 4:
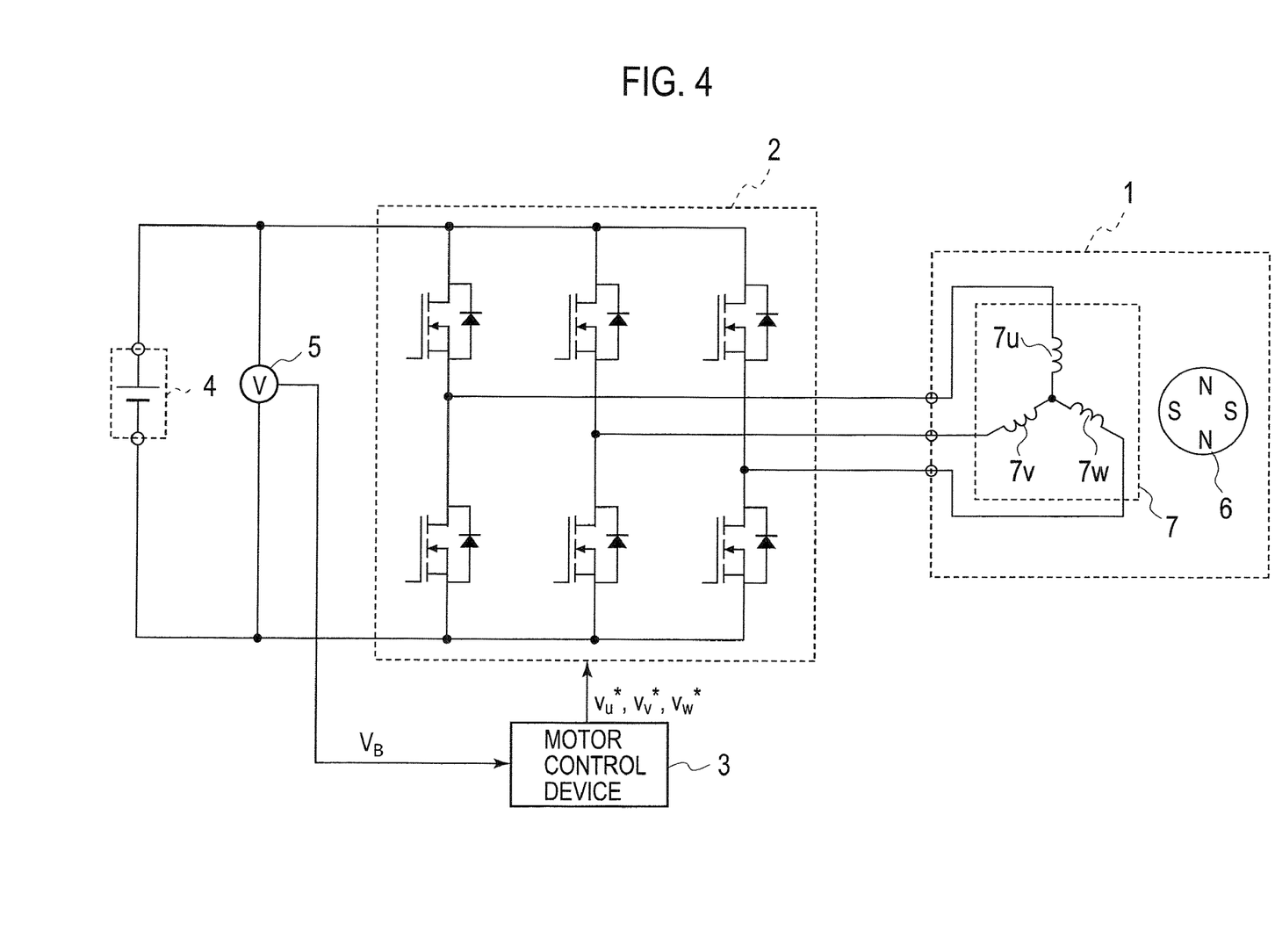
FIG. 4 is a circuit diagram showing a connection relation of the motor, inverter, and DC power source.

FIG. 4 is a circuit diagram showing a connection relation of the motor 1, the inverter 2, and the DC power source 4. The motor 1 includes a rotor 6 provided with a permanent magnet, and a stator 7 to which U-phase, V-phase, and W-phase armature winding 7u, 7v, and 7w is provided. The armature winding 7u, 7v, and 7w is connected by a Y-connection with the neutral point as its center.

The inverter 2 includes a U-phase half bridge circuit, a V-phase half bridge circuit, and a W-phase half bridge circuit. Each of the half bridge circuits has a pair of switching elements that are series-connected, and a DC output voltage from the DC power source 4 is applied to each of the half bridge circuits. Moreover, a free wheel diode having the direction from the low voltage side to the high voltage side of the DC power source 4 as its forward direction is parallely-connected to each of the switching elements. Although a field-effect transistor is shown as each of the switching elements in FIG. 4, these can be substituted by such as an IGBT (insulated gate bipolar transistor).

The inverter 2 generates a PWM signal (pulse width modulated signal) for each phase based on the three-phase voltage command values given from the motor control device 3, and causes each of the switching elements to perform switching operations by giving the PWM signal to a control terminal (the base or the gate) of each switching element within the inverter 2. The three-phase voltage command values supplied to the inverter 2 from the motor control device 3 are composed of a U-phase voltage command value $v_u^*$, a V-phase voltage command value $v_v^*$, and a W-phase voltage command value $v_w^*$.

The input voltage to the inverter 2, which is the output voltage of the DC power source 4, is converted to the pulse width modulated three-phase AC voltage by the switching operations of each switching element within the inverter 2. By the three-phase AC voltage being applied to the motor 1 and by the electrical current according to the three-phase AC voltage flowing at each armature winding (7u, 7v, and 7w), the motor 1 is driven.

A voltage detector 5 detects a voltage value of the input voltage to the inverter 2, which is the output voltage of the DC power source 4, and conveys the detected value to the motor control device 3. The detected voltage value is expressed by $V_B$.

The motor control device 3 basically vector-controls such that θ and $θ_e$ coincide (see FIG. 3). However, there is an instance in which θ and $θ_e$ are shifted intentionally. When θ and $θ_e$ coincide, the d-axis and the q-axis coincide the γ-axis and the δ-axis respectively.

In the descriptions below, the γ-axis component and the δ-axis component of the motor voltage $V_a$ will be called a γ-axis voltage and a δ-axis voltage respectively, and the γ-axis voltage or the γ-axis voltage value will be expressed by a symbol vγ, while the δ-axis voltage or the δ-axis voltage value will be expressed by a symbol vδ. Moreover, the γ-axis component and the δ-axis component of the motor current $I_a$ will be called a γ-axis current and a δ-axis current respectively, and the γ-axis current or the γ-axis current value will be expressed by a symbol iγ, while the δ-axis current or the δ-axis current value will be expressed by a symbol iδ.

The voltage command values indicating a target value for the γ-axis voltage vγ and the δ-axis voltage vδ will be expressed respectively as a γ-axis voltage command value vγ* and a δ-axis voltage command value vδ*. The current command values indicating a target value for the γ-axis current iγ and the δ-axis current iδ will be expressed respectively as a γ-axis current command value iγ* and a δ-axis current command value iδ*. The vγ* also may be called a target γ-axis voltage as a target value for the vγ, and vδ* also may be called a target δ-axis voltage as a target value for the vδ. The iγ* also may be called a target γ-axis current as a target value for the iγ, and the iδ* also may be called a target δ-axis current as a target value for the iδ.

The motor control device 3 vector-controls such that the γ-axis voltage value vγ and the δ-axis voltage value vδ respectively follow the γ-axis voltage command value vγ* and the δ-axis voltage command value vδ*, and the γ-axis current value iγ and the δ-axis current value iδ respectively follow the γ-axis current command value iγ* and the δ-axis current command value iδ*.

The U-phase component, V-phase component, and W-phase component of the motor voltage $V_a$ follow the three-phase voltage command values that are composed of the U-phase voltage command value $v_u^*$, the V-phase voltage command value $v_v^*$, and the W-phase voltage command value $v_w^*$.

Also, in the descriptions below, $R_a$ is a motor resistance (resistance value of the armature winding of the motor 1), and $L_d$ and $L_q$ are d-axis inductance (the d-axis component of the armature winding inductance of the motor 1) and q-axis inductance (the q-axis component of the armature winding inductance of the motor 1) respectively. $Φ_a$ is armature inter-linkage magnetic flux by the permanent magnet 1a. In addition, $R_a$, $L_d$, $L_q$, and $Φ_a$ are the values determined at the time of manufacture of the motor drive system, and these values are used for the computation at the motor control device 3.

In this specification, for simplicity of descriptions, there is an instance in which the state quantity corresponding to a symbolic description such as the iγ may be expressed only by such a symbolic expression. In other words, in this specification, for example "iγ", "γ-axis current iγ", or "γ-axis current value iγ" may indicate the same thing.

First Embodiment

Figure 5:
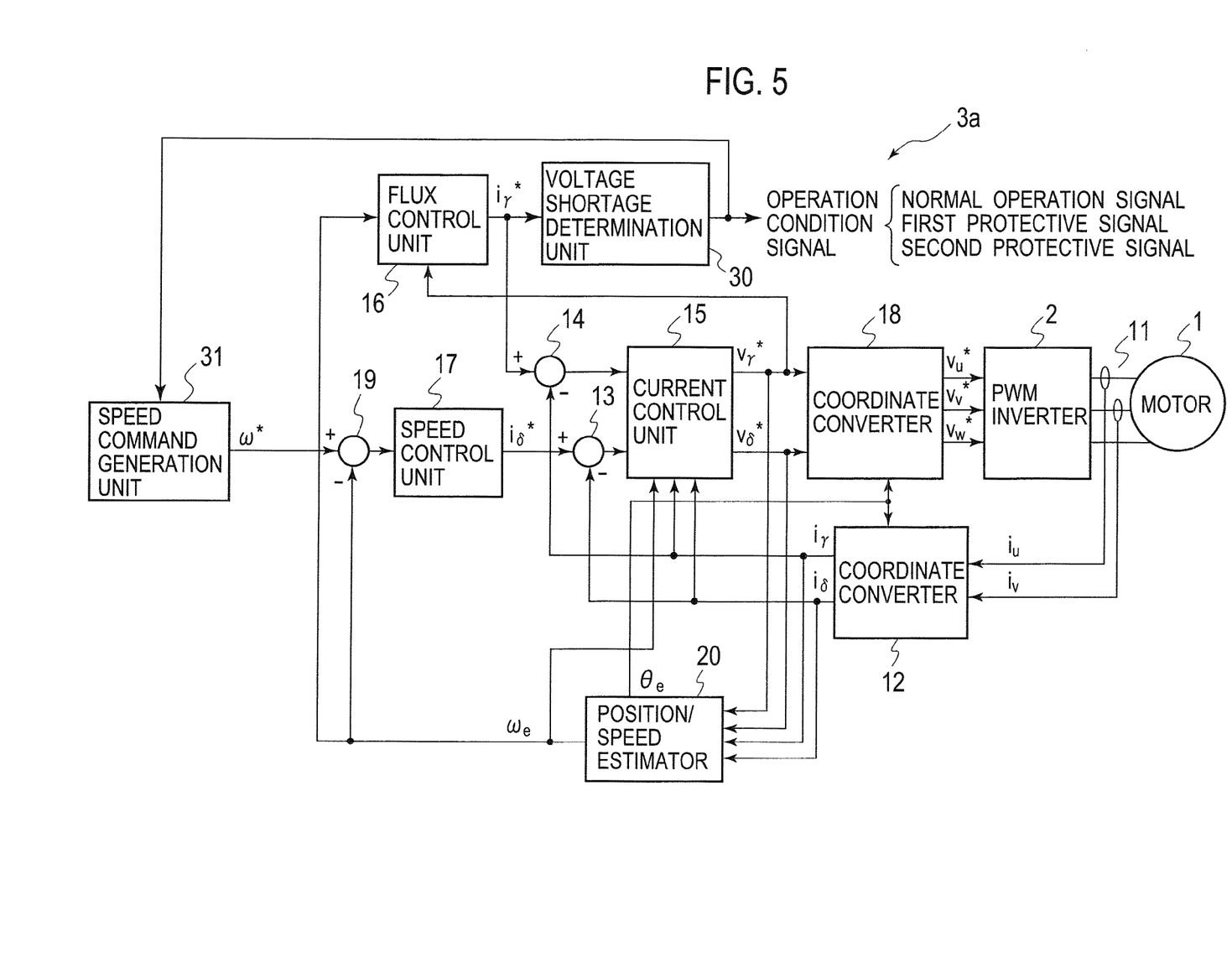
FIG. 5 is a detailed block diagram of the motor drive system according to the first embodiment of the invention.

The first embodiment of the invention will now be explained. FIG. 5 is a detailed block diagram of the motor drive system according to the first embodiment. The motor drive system of FIG. 5 includes the motor 1 and the inverter 2 as shown in FIG. 2, and a motor control device 3a that functions as the motor control device of FIG. 2, and a phase current sensor 11. The motor control device 3a includes each part referred to by the numerical symbols 12-20 and 30. Each part within the motor control device 3a can freely utilize each value generated within the motor control device 3a. The phase current sensor 11 and/or the speed command generation unit 31 can be considered as being provided either within the motor control device 3a or outside the motor control device 3a.

Each part that forms the motor control system of the first embodiment and the second embodiment as described below updates at a predetermined cycle the command values (including $\omega^*$, $i\gamma^*$, $i\delta^*$, $v\gamma^*$, $v\delta^*$, $v_u^*$, $v_v^*$, and $v_w^*$) that it computes (or detects) and outputs, or the state quantity (including $i_u$, $i_v$, $i\gamma$, $i\delta$, $\theta_e$, and $\omega_e$).

The motor drive system of the first embodiment estimates the dq axis. In other words, vector-control is performed such that the γ-axis and the δ-axis coincide with the d-axis and the q-axis respectively.

The phase current sensor 11 detects the current values of the U-phase current and the V-phase current which are the fixed axis components of the motor current $I_a$ supplied to the motor 1 from the inverter 2. The U-phase current or the U-phase current value is expressed as $i_u$; the V-phase current or the V-phase current value is expressed as $i_v$; and the W-phase current or the W-phase current value is expressed as $i_w$. The W-phase current value $i_w$ is computed from the relational expression "$i_w = -i_u - i_v$". The $i_u$, $i_v$, and $i_w$ are the U-phase armature winding current value, the V-phase armature winding current value, and the W-phase armature winding current value at the stator of the motor 1.

A coordinate converter 12 computes and outputs the γ-axis current value iγ and the δ-axis current value iδ by coordinate converting the U-phase current value $i_u$ and the V-phase current value $i_v$ onto the γδ axis based on the rotor position $\theta_e$. A position/speed estimator 20, which will be abbreviated as the estimator 20 below, computes the rotation speed $\omega_e$ and the rotor position $\theta_e$.

The speed command generation unit 31 generates a rotation speed command value $\omega^*$ for rotating the rotor of the motor 1 in a desired rotation speed. In the first embodiment, a subtractor 19 computes the velocity deviation ($\omega^* - \omega_e$) by subtracting the rotation speed $\omega_e$ from the estimator 20 from the rotation speed command value $\omega^*$ from the speed command generation unit 31.

A speed control unit 17 computes and outputs a δ-axis current command value iδ* such that the velocity deviation ($\omega^* - \omega_e$) converges to zero by utilizing for example proportional-integral control.

A flux control unit 16 computes and outputs a γ-axis current command value iγ*. The iγ* may take various values depending on the kind of vector control executed at the motor drive system and the rotation speed. In this embodiment, since the dq axis is being estimated, when the control is performed to make the d-axis current zero, it is made such that iγ*=0. Moreover, when the maximum torque control and weak magnetic flux control are performed, the iγ* takes a negative value according to the rotation speed $\omega_e$.

A subtractor 14 computes a current error (iγ*−iγ) by subtracting the γ-axis current value iγ outputted from the coordinate converter 12 from the γ-axis current command value iγ* outputted from the flux control unit 16. A subtractor 13 computes a current error (iδ*−iδ) by subtracting the δ-axis current value iδ outputted from the coordinate converter 12 from the δ-axis current command value iδ* outputted from the speed control unit 17.

A current control unit 15 performs current feedback control such that the current errors (iγ*−iγ) and (iδ*−iδ) both converge to zero by utilizing for example the proportional-integral control. At this time, the γ-axis voltage command value vγ* and the δ-axis voltage command value vδ* are computed such that (iγ*−iγ) and (iδ*−iδ) both converge to zero by utilizing noninteracting control for eliminating the interaction between the γ-axis and the δ-axis. In computing the vγ* and the vδ*, the $\omega_e$ as well as the iγ and the iδ also are being referred to.

A coordinate converter 18 computes and outputs three-phase voltage command values ($v_u^*$, $v_v^*$, and $v_w^*$) by coordinate converting the vγ* and the vδ* given by the current control unit 15 onto the three-phase fixed coordinate axes based on the rotor position $\theta_e$ outputted from the estimator 20.

The inverter 2 generates PWM signals according to the three-phase voltage command values ($v_u^*$, $v_v^*$, and $v_w^*$) and drives the motor 1 by supplying the motor current $I_a$ according to the PWM signals.

The estimator 20 estimates the rotor position $\theta_e$ and the rotation speed $\omega_e$ such that the axial error Δθ (see FIG. 3) between the d-axis and the γ-axis converges to zero by performing for example the proportional-integral control utilizing all or part of the iγ and the iδ from the coordinate converter 12 and the vγ* and the vδ* from the current control unit 15. Various methods are proposed as the estimation method of the rotor position $\theta_e$ and the rotation speed $\omega_e$. The estimator 20 can be formed by a known estimation method.

Figure 6:
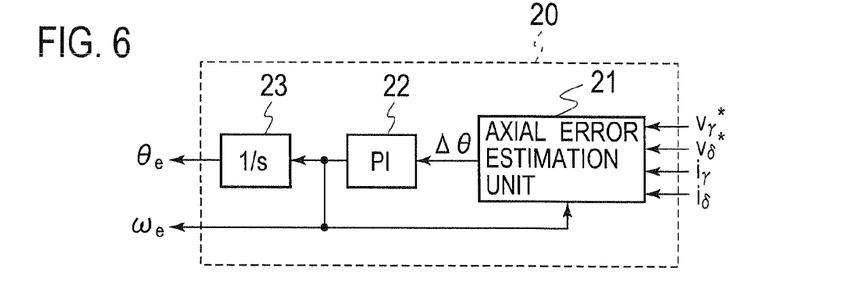
FIG. 6 is an internal block diagram of a position/speed estimator of FIG. 5.

FIG. 6 shows one example of an internal block diagram of the estimator 20. The estimator 20 of FIG. 6 includes each part being referred to by the numerical symbols 21 to 23. An axial error estimation unit 21 computes the axial error Δθ by using the formula (1) below which also is shown in Japanese patent No. 3411878. A proportional-integral computing unit 22 computes the rotation speed $\omega_e$ such that the axial error Δθ computed at the axial error estimation unit 21 converges to zero by performing the proportional-integral control so as to achieve PLL (Phase Locked Loop) control. An integrator 23 computes the rotor position $\theta_e$ by integrating the rotation speed $\omega_e$. The computed $\theta_e$ and $\omega_e$ are given to each part within the motor control device 3a that requires these values.

$$\Delta\theta = \tan^{-1}\left(\frac{-(v_\gamma^* - R_a i_\gamma + \omega_e L_q i_\delta)}{v_\delta^* - R_a i_\delta - \omega_e L_q i_\gamma}\right) \quad (1)$$

When the necessary current cannot be supplied from the inverter 2 to the motor 1 due to the decrease in the input voltage $V_B$ to the inverter 2 or due to the increase in the induced voltage by high-speed rotations of the motor 1, the flux control unit 16 performs weak magnetic flux control by a negative d-axis current (the d-axis current indicates the d-axis component of the motor current $I_a$). Supplying the negative d-axis current acts to decrease the d-axis component of the magnetic flux linked to the armature winding of the motor 1. In this embodiment, since the dq axis estimation is performed, the d-axis current and the γ-axis current usually coincide, and also since the γ-axis current value iγ follows the γ-axis current command value iγ*, a negative γ-axis current command value iγ* acts to decrease the d-axis component of the above magnetic flux, and its degree of the decrease becomes larger as the absolute value of the negative γ-axis current command value iγ* becomes larger.

At the time of performing the weak magnetic flux control, the flux control unit 16 computes the γ-axis current command value iγ* by utilizing a method as described for example in Japanese Patent Laid-Open No. 2006-204054. In particular, the iγ* is computed according to the formula (2a) below. In addition, it is possible that the iγ* may be computed according to the formula (2b) below, and the iγ* also may be computed according to the formula (2c) below, which is the computation formula for the current command value of the general weak magnetic flux control. When the iγ* is computed according to the formula (2b) or the formula (2c), the output values of the coordinate converter 12 are being referred to arbitrarily.

$$i_\gamma^* = -\frac{\Phi_a}{L_d} + \frac{1}{\omega_e L_d}\sqrt{V_{om}^2 - v_\gamma^{*2}} \quad (2a)$$

$$i_\gamma^* = -\frac{\Phi_a}{L_d} + \frac{1}{\omega_e L_d}\sqrt{V_{om}^2 - v_\gamma^* - R_a \cdot i_\gamma)^2} \quad (2b)$$

$$i_\gamma^* = -\frac{\Phi_a}{L_d} + \frac{1}{\omega_e L_d}\sqrt{V_{om}^2 - (\omega_e L_q i_\delta)^2} \quad (2c)$$

Here, $V_{om}$ indicates a clamping voltage to the induced voltage $V_0$. The induced voltage $V_0$ is generated by the rotation of the motor 1, the inductance of the motor 1, and the armature interlinkage magnetic flux. The value for the clamping voltage $V_{om}$ is set for example by using the method as described in Japanese Patent Laid-Open No. 2006-204054 based on the detected value $V_B$ for the input voltage to the inverter 2 (see FIG. 4). When the input voltage to the inverter 2 is decreased, the clamping voltage $V_{om}$ also is decreased, whereas when the input voltage to the inverter 2 is increased, the clamping voltage $V_{om}$ also is increased.

A voltage shortage determination unit 30 determines whether or not the voltage to be supplied from the inverter 2 to the motor 1 to drive the motor 1 according to the iγ* and the iδ* is running short based on the γ-axis current command value iγ*. The shortage of the voltage to be determined here will be called a supply voltage shortage below. When the load torque to the motor 1 is increased or when the input voltage to the inverter 2 is decreased, a possibility of an occurrence of the supply voltage shortage becomes high, and such an occurrence of the supply voltage shortage may cause a step-out of the motor 1 although this may depend on the degree of the shortage and the increasing speed of the load torque or the decreasing speed of the input voltage.

Figure 7:
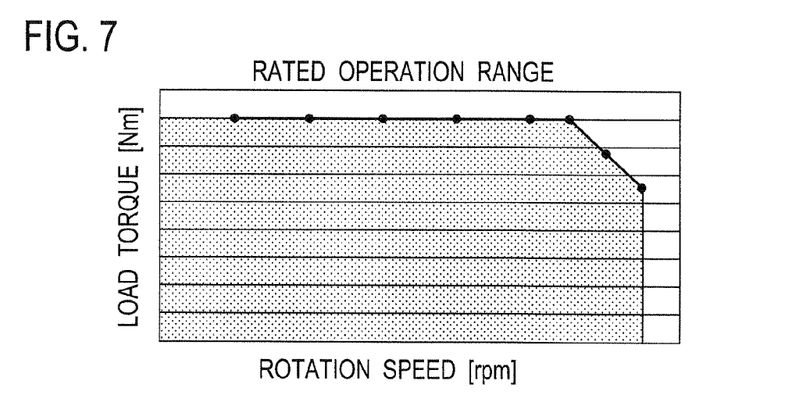
FIG. 7 is a graph showing a rated operation range of the motor.

The determination method of the supply voltage shortage and its principle will be explained in detail. Generally, the rated operation range of a motor has the characteristic features as shown in FIG. 7. The rated operation range of a motor indicates the range in which the motor can be driven safely, and the motor 1 also follows this rated operation range of FIG. 7. The hatched line region of FIG. 7 corresponds to the rated operation range of the motor 1. In FIG. 7, the horizontal axis indicates the rotation speed, while the vertical axis indicates the load torque that can be acted on the motor 1. When the rotation speed becomes high, the induced voltage generated within the motor 1 becomes higher. If such an elevation is allowed without restrictions, the supply voltage shortage occurs, but restrictions are applied to the elevation of the induced voltage by performing the weak magnetic flux control, thus expanding the rated operation range of the motor 1 to the high-speed rotation range. In each of the graphs as shown in FIG. 7 and FIGS. 8 to 10 which will be described below, the right side of the horizontal axis corresponds to the high-speed side of the rotation speed.

Figure 8:
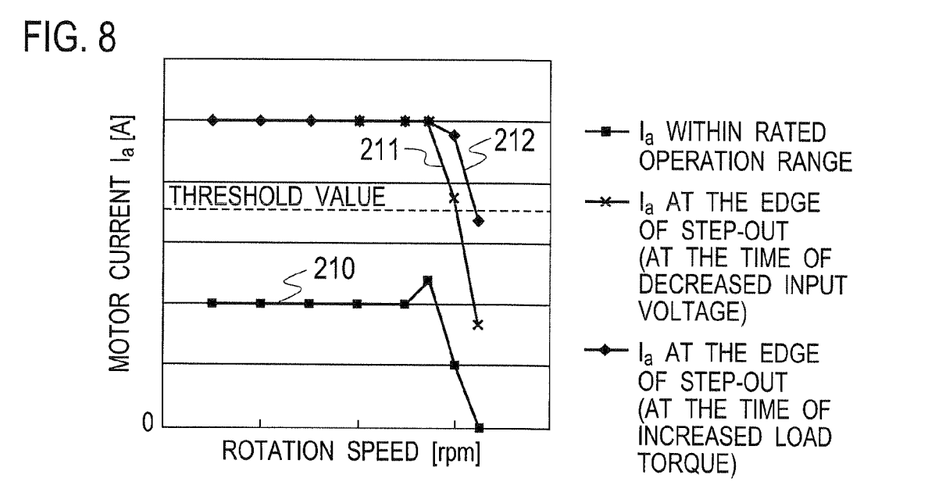
FIG. 8 is a graph showing a rotation-speed dependence property of the motor current under various conditions.

FIG. 8 is a graph on which the current values of the motor current $I_a$ are plotted when the rotation speed of the motor 1 is changed under predetermined conditions. In FIG. 8, the polygonal line 210 indicates the rotation speed dependence property of the motor current $I_a$ when the motor 1 is driven under the basic conditions. Driving the motor 1 under the basic conditions is driving of the motor 1 within the rated operation range. Such basic conditions include a condition for the input voltage to the inverter 2 and a condition for the load torque. On the other hand, the polygonal lines 211 and 212 indicate the rotation speed dependence properties of the motor current $I_a$ when the motor 1 is driven under the conditions that deviate from the rated operation range. In the conditions that deviate from the rated operation range, the supply voltage shortage is occurring. The polygonal line 211 indicates the rotation speed dependency property when the input voltage to the inverter is decreased to the edge of the step-out with the basic conditions as a benchmark, while the polygonal line 212 indicates the rotation speed dependency property when the load torque is increased to the edge of the step-out with the basic conditions as a benchmark.

When trying to detect whether or not there is the supply voltage shortage based on the magnitude correlation between the current value of the motor current $I_a$ and a threshold value set for comparison with the current value of the motor current $I_a$, even though the conditions that correspond to the polygonal line 210 and the conditions that correspond to the polygonal lines 211 and 211 can be distinguished in the low-speed rotation range, such distinction is either difficult or not possible in the high-speed rotation range. This is because when the rotation speed is $\omega_1$, the current values of the motor current $I_a$ under all the conditions fall under the threshold value as shown in FIG. 8. As such, it is difficult to detect the supply voltage shortage just by referring to the current values of the motor current $I_a$.

Figure 9:
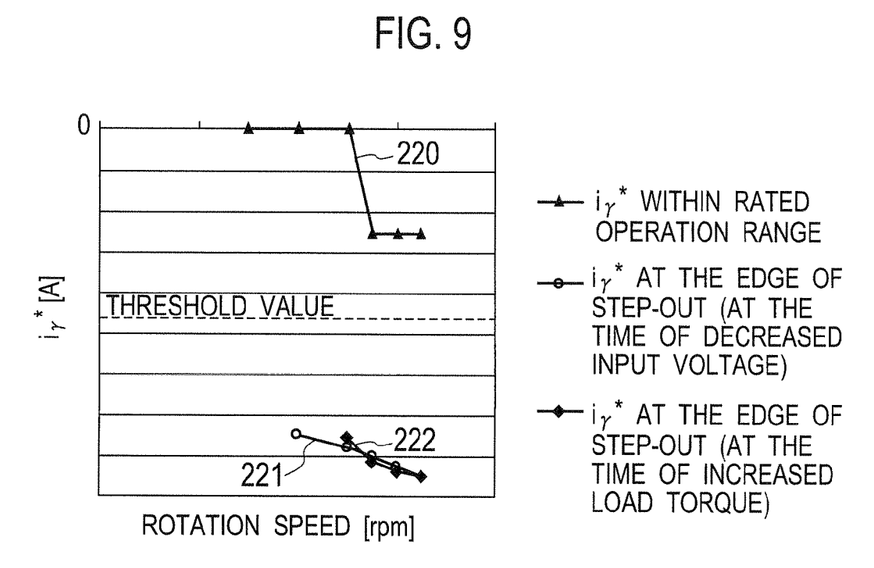
FIG. 9 is a graph showing a rotation-speed dependence property of a γ-axis current command value under various conditions.

FIG. 9 is a graph on which the γ-axis current command values iγ* are plotted when the rotation speed of the motor 1 is changed under predetermined conditions. In FIG. 9, the polygonal line 220 indicates the rotation speed dependence property of the γ-axis current command value iγ* when the motor 1 is driven under the basic conditions. Driving the motor 1 under the basic conditions is driving of the motor 1 within the rated operation range. Such basic conditions include a condition for the input voltage to the inverter 2 and a condition for the load torque. On the other hand, the polygonal lines 221 and 222 indicate the rotation speed dependence properties of the γ-axis current command value iγ* when the motor 1 is driven under the conditions that deviate from the rated operation range. In the conditions that deviate from the rated operation range, the supply voltage shortage is occurring. The polygonal line 221 indicates the rotation speed dependency property when the input voltage to the inverter is decreased to the edge of the step-out with the basic conditions as a benchmark, while the polygonal line 212 indicates the rotation speed dependency property when the load torque is increased to the edge of the step-out with the basic conditions as a benchmark.

As can be seen from FIG. 9, by referring to the iγ* it is possible to distinguish easily the conditions corresponding to the polygonal line 220 and the conditions corresponding to the polygonal lines 221 and 222 by a certain threshold value. Based on this principle, the voltage shortage determination unit 30 determines whether or not the supply voltage shortage is occurring based on the γ-axis current command value iγ*.

The reason why such a graph as shown in FIG. 9 can be obtained will be supplementarily explained. When the input voltage to the inverter 2 decreases, it becomes closer for the supply voltage shortage to occur. At this time, a negative γ-axis current command value iγ* is set so as to avoid an occurrence of the supply voltage shortage by generating the weak magnetic flux. When the degree of decrease in the input voltage is increased, the absolute value of the negative γ-axis current command value iγ* that is set also increases (the right side the second terms of the formulas (2a), (2b), and (2c) decrease), and when such degree of the decrease is too large, an occurrence of the supply voltage shortage cannot be avoided. This condition corresponds to the polygonal line 221.

Also, when the load torque increases, a larger δ-axis current iδ flows to generate a torque that corresponds to the load torque to the motor, with which a larger motor voltage $V_a$ becomes necessary. Obviously, an increase of the required motor voltage $V_a$ acts in a direction to cause the supply voltage shortage to occur. Moreover, an increase in the δ-axis current iδ at the time of performing the weak magnetic flux control acts in a direction to increase the absolute value of the negative γ-axis current command value iγ* being set (acts in a direction to decrease the right side the second terms of the formulas (2a), (2b), and (2c)) through an increase of the vγ*. When the load torque becomes too large, the occurrence of the supply voltage shortage cannot be avoided. This condition corresponds to the polygonal line 222.

In particular, the voltage shortage determination unit 30 compares the γ-axis current command value iγ* at the time of performing the weak magnetic flux control and a predetermined negative determination threshold value. When the former is greater than the latter, it determines that the supply voltage shortage is not occurring, while when the former is smaller than the latter, it determines that the supply voltage shortage is occurring. The number of the determination threshold value can be one and above. Now it is assumed that the determination threshold value includes the first determination threshold value $TH_1$ and the second determination threshold value $TH_2$. The first determination threshold value $TH_1$ and the second determination threshold value $TH_2$ are constant values. The voltage shortage determination unit 30 determines which of the three numerical value ranges the iγ* belongs to by comparing the γ-axis current command value iγ* and each of the first determination threshold value $TH_1$ and the second determination threshold value $TH_2$. (Here, 0>iγ* and 0>$TH_1$>$TH_2$.) In this example, the three numerical value ranges are composed of a normal range, a first protective range, and a second protective range that are not overlapping with each other.

Figure 10:
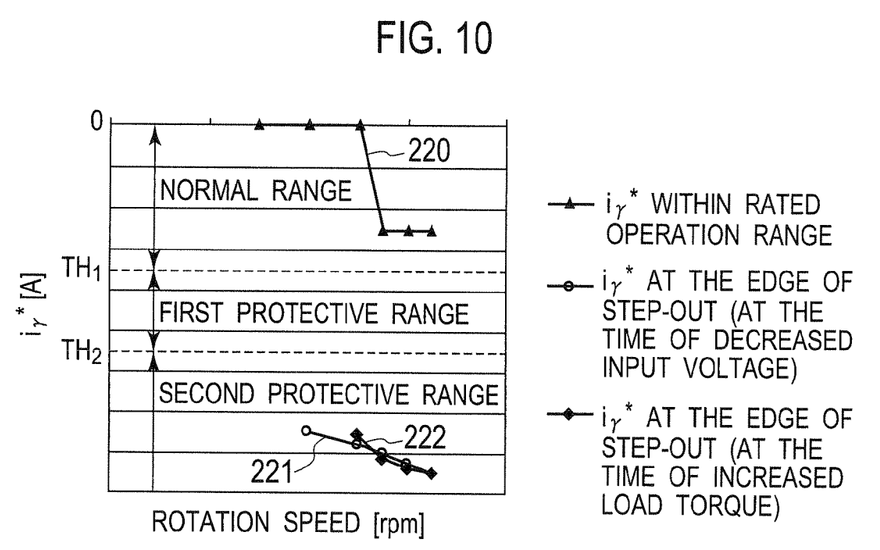
FIG. 10 is a view in which determination threshold lines to be compared with the γ-axis current command value are superimposed to the graph of FIG. 9.

FIG. 10 is a graph in which the lines corresponding to the first determination threshold value $TH_1$ and the second determination threshold value $TH_2$ are superimposed onto the graph of FIG. 9. It is determined that when the first inequality expression "iγ*≧$TH_1$" is true, the iγ* belongs to the normal range; when the second inequality expression "$TH_1$>iγ*≧$TH_2$" is true, the iγ* belongs to the first protective range; and when "$TH_2$>iγ*" is true, the iγ* belongs to the second protective range.

The signal indicating which numerical value range the iγ* belongs to is outputted from the voltage shortage determination unit 30 as an operation condition signal. When the iγ* belongs to the normal range, the voltage shortage determination unit 30 determines that the supply voltage shortage is not occurring, and outputs a normal operation signal indicating that effect as the operation condition signal. On the other hand, when the iγ* belongs to the first protective range, the voltage shortage determination unit 30 determines that the supply voltage shortage is occurring, and outputs a first protective signal indicating that effect as the operation condition signal. Also, when the iγ* belongs to the second protective range, the voltage shortage determination unit 30 determines that the supply voltage shortage is occurring, and outputs a second protective signal indicating that effect as the operation condition signal.

The operation condition signal from the voltage shortage determination unit 30 is supplied to the speed command generation unit 31 of FIG. 5. When the operation condition signal is the first or second protective signal, the speed command generation unit 31 applies restrictions to the rotation speed command value ω* that it generates and outputs. In particular, when the operation condition signal is the first protective signal, the rotation speed command value ω* is generated such that the rotation speed ($ω_e$) of the motor 1 does not increase from the current rotation speed (that is, an increase of the rotation speed command value ω* is restricted). When the operation condition signal is the second protective signal, the rotation speed command value ω* is generated such that the rotation speed ($ω_e$) of the motor 1 is decreased from the current rotation speed (that is, the next rotation speed command value ω* is decreased from the current rotation speed command value ω*).

Since increasing the rotation speed when the supply voltage shortage is occurring increases the risk of an occurrence of the step-out, protection is given for preventing the step-out by restricting the increase of the rotation speed or by decreasing the rotation speed. When the operation condition signal is the normal operation signal, such restrictions are not applied, and the speed command generation unit 31 outputs an arbitrary rotation speed command value ω* within the rated operation range.

Moreover, since the iγ* varies at a given control cycle, it is possible that the control on the rotation speed command value ω* may make the motor control unstable. Considering this, the iγ* outputted from the flux control unit may be entered to a lowpass filter (not shown) thus removing the high-frequency component of the iγ*, and based on a comparison result between the filtered iγ* and a determination threshold value ($TH_1$ and $TH_2$), the determination of whether or not the supply voltage shortage is occurring, the output of the operation condition signal, and the adjustment of the ω* may be performed. Alternatively, it also may be made such that the operation condition signal does not change in a short time by providing hysteresis to the determination threshold value ($TH_1$ and $TH_2$). That is, for example when the condition was shifted from the condition in which the above third inequality expression is not true to the condition in which the above third inequality expression is true, while outputting the second protective signal, the second determination threshold value $TH_2$ used for the next go-round or later is tentatively increased in the positive direction. Thereafter, if the third inequality expression using the tentatively increased $TH_2$ is not true, the $TH_2$ is returned to the original value. The same thing applies to the first determination threshold value $TH_1$.

The operation condition signal from the voltage shortage determination unit 30 or a signal indicating that the restrictions are applied to the rotation speed command value ω* based on the operation condition signal is outputted to an external device (not shown) of the motor drive system. For example, the occurrence of the supply voltage shortage, the possibility of the step-out, and the effect that the system is under a protective operation for step-out prevention are conveyed to the external device by outputting the signals to the external device using communications such as via CAN (Control Area Network) generally used with in-vehicle communications or serial communications. Also, a user of the motor drive system may be informed of the effect that the restrictions are applied to the rotation speed command value $\omega^*$ based on the operation condition signal. The media for this notification is arbitrary. For example, display on a liquid crystal display panel, visual alert using light emission of a lamp, and/or auditory alert using sound from a speaker or a buzzer may be used.

When the number of the determination threshold value is one, it is sufficient to compare the $i\gamma^*$ and one determination threshold value ($TH_1$, $TH_2$, or their intermediate value). In this case, if the former is greater than or equal to the latter, the voltage shortage determination unit 30 determines that the $i\gamma^*$ belongs to the normal range and that the supply voltage shortage is not occurring, and outputs the normal operation signal indicating that effect as the operation condition signal. On the other hand, if the former is less than the latter, it determines that the $i\gamma^*$ belongs to the protective range and that the supply voltage shortage is occurring, and outputs the protective signal indicating that effect as the operation condition signal. When the protective signal is outputted, the speed command generation unit 31 generates the rotation speed command value $\omega^*$ such that the rotation speed of the motor 1 does not increase from the current rotation speed or the rotation speed of the motor 1 is decreased from the current rotation speed.

By constructing the motor drive system as described above, the occurrence of the step-out can be prevented effectively by determining the existence or nonexistence of the supply voltage shortage occurrence.

Here, since the $\gamma$-axis current $i\gamma$ that corresponds to the d-axis current follows the $i\gamma^*$, it also may be considered to perform determination of the supply voltage shortage based on the $\gamma$-axis current $i\gamma$. However, the $\gamma$-axis current $i\gamma$ follows the $\gamma$-axis current command value $i\gamma^*$ with some control delay according to the characteristic features of the feedback control such as the proportional-integral control, and if the determination of the supply voltage shortage and the step-out prevention process are performed based on the $\gamma$-axis current $i\gamma$, the processing may be too late and the risk for the occurrence of the step-out may be heightened. Such risk becomes higher when the decrease of the input voltage or the increase of the load torque is precipitous. On the other hand, the motor drive system according to the embodiment utilizes the $\gamma$-axis current command value $i\gamma^*$ that does not have such control delay, and thus, it becomes possible to perform the determination of the supply voltage shortage and the step-out prevention processing instantaneously.

Moreover, since the determination of the supply voltage shortage is performed by a comparison between the $i\gamma^*$ and a simple threshold value, the determination processing burden is minor. Further, one determination method can accommodate both the input voltage fluctuation and the load torque fluctuation.

At the time of an occurrence of the supply voltage shortage, if the d-axis current command value (d-axis current target value) is periodically fluctuated as in the method described in Japanese Patent Laid-Open No. 2005-151635, there is more danger of triggering the step-out due to the fluctuation of the q-axis current. Also, since there is a margin in the ability to supply currents the motor when the step-out is not occurring, even if the d-axis current command value (d-axis current target value) is periodically fluctuated, it can be considered that there is no difference in the q-axis current between the condition in which the supply voltage shortage is occurring and the condition in which the supply voltage shortage is not occurring. Thus, even if the method of Japanese Patent Laid-Open No. 2005-151635 is used, the supply voltage shortage cannot be detected.

Second Embodiment

Figure 11:
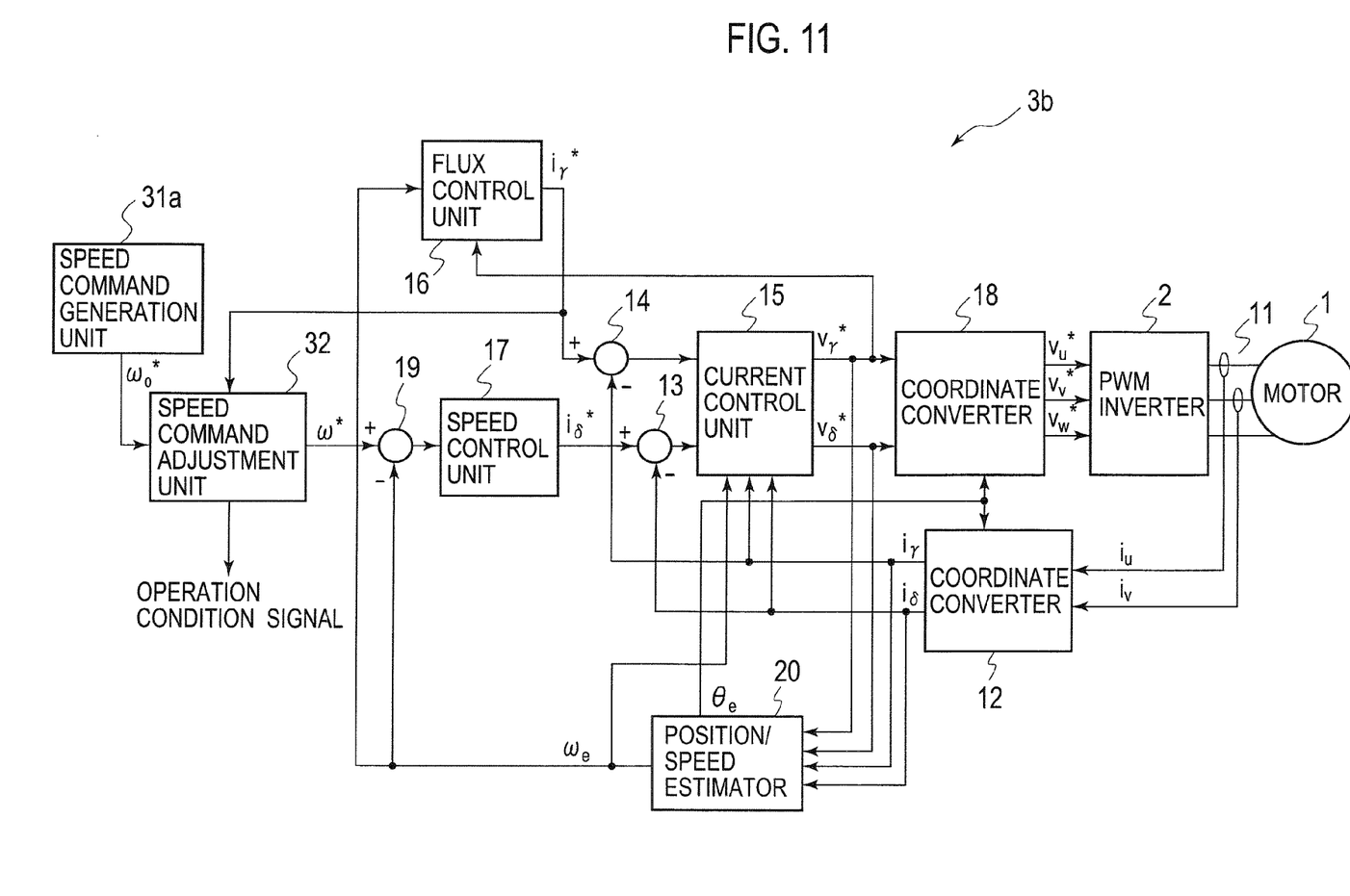
FIG. 11 is a detailed block diagram of the motor drive system according to the second embodiment of the invention.

Next, the second embodiment of the invention will be explained. FIG. 11 is a detailed block diagram of the motor drive system according to the second embodiment. The motor drive system of FIG. 11 includes the motor 1 and the inverter 2 as shown in FIG. 2, the motor control device 3b that functions as the motor control device 3 of FIG. 2, and a phase current sensor 11. The motor control device 3b includes each part referred to by the numerical symbols 12-20 and 32. Each part within the motor control device 3b can freely utilize each value generated within the motor control device 3b. The phase current sensor 11 and/or the speed command generation unit 31a can be considered as being provided either within the motor control device 3b or outside of the motor control device 3b.

In the motor drive system according to the second embodiment, the voltage shortage determination unit 30 and the speed command generation unit 31 are removed from the motor drive system of the first embodiment, and instead a speed command adjustment unit 32 and a speed command generation unit 31a are provided. Other than these differences, the configuration and the operation of the two motor drive systems are the same. Thus, the second embodiment will be explained by focusing only on the differences between the two motor drive systems. For the contents that are not specifically described, the descriptions of the first embodiment apply to the second embodiment. Although the block diagrams of FIG. 5 and FIG. 11 are different, the first embodiment and the second embodiment are the same regarding the point that the $\omega^*$ is adjusted based on the $i\gamma^*$.

The speed command generation unit 31a generates a rotation speed command value for rotating the rotor of the motor 1 at desired rotation speed, but this rotation speed command value can be adjusted at the speed command adjustment unit 32. The rotation speed command value outputted from the speed command generation unit 31a is expressed by $\omega_0^*$.

The speed command adjustment unit 32 has the same function as the voltage shortage determination unit 30 of FIG. 5. More specifically, it has a function to adjust the rotation speed command value to be given to the subtractor 19 based on the comparison result of the $\gamma$-axis current command value $i\gamma^*$ at the time of performing the weak magnetic flux control and a predetermined negative determination threshold value. In the first embodiment, the rotation speed command value is adjusted through the determination of whether or not the occurrence of the supply voltage shortage exists, but in the second embodiment, the rotation speed command value is adjusted directly based on the comparison result between the $i\gamma^*$ and the determination threshold. However, the speed command adjustment unit 32 may perform determination of whether or not the supply voltage shortage exists.

In particular, the speed command adjustment unit 32 compares the $\gamma$-axis current command value $i\gamma^*$ at the time of performing the weak magnetic flux control and the predetermined negative determination threshold value, and if the former is greater than the latter, it outputs the $\omega_0^*$ as the $\omega^*$ without change from the speed command generation unit 31a to the subtractor 19. On the other hand, if the former is smaller than the latter, it applies a restriction to the $\omega_0^*$ from the speed command generation unit 31a and outputs the rotation speed command value as the $\omega^*$ to the subtractor 19 after the restriction is applied. In the second embodiment, by subtracting the $\omega_e$ from the estimator 20 from the $\omega^*$ from the speed command adjustment unit 32, the subtractor 19 computes and outputs the velocity deviation ($\omega^*-\omega_e$) between the two.

Similarly to the first embodiment, the number of the determination threshold value can be one and above. Similarly to the first embodiment, an instance in which the determination threshold includes the first determination threshold value $TH_1$ and the second determination threshold value $TH_2$ will be considered. In this case, the speed command adjustment unit 32 outputs the operation condition signal based on the comparison result between the $i\gamma^*$ and the $TH_1$ and $TH_2$ respectively, and adjusts the $\omega^*$. Also, as described in the first embodiment, this comparison may be performed after the high-frequency component of $i\gamma^*$ is removed, or hysteresis may be provided to the determination threshold values.

The processing performed based on this comparison result is the same as that of the first embodiment. That is, when the first inequality expression "$i\gamma^* \geq TH_1$" is true, it is determined that the $i\gamma^*$ belongs to the normal range, and the normal operation signal indicating that effect is outputted as the operation condition signal, and the $\omega_0^*$ is outputted as the $\omega^*$ without change.

When the second inequality expression "$TH_1 > i\gamma^* \geq TH_1$" is true, it is determined that the $i\gamma^*$ belongs to the first protective range, and the first protective signal indicating that effect is outputted as the operation condition signal, and the rotation speed command value $\omega^*$ is generated such that the rotation speed ($\omega_e$) of the motor 1 does not increase from the current rotation speed. Thus, in a condition in which the second inequality expression is true, if the present-round $\omega^*$ is decreased from the last-round $\omega_0^*$, the $\omega^*$ also is decreased (that is, it is made such that $\omega^* = \omega_0^*$ in the present-round), but even if the present-round $\omega_0^*$ is increased from the last-round $\omega_0^*$, the $\omega^*$ does not increase (that is, the present-round $\omega^*$ is made to have the value of the last-round $\omega_0^*$).

When the third inequality expression "$TH_2 > i\gamma^*$" is true, it is determined that the $i\gamma^*$ belongs to the second protective range, and the second protective signal indicating that effect is outputted as the operation condition signal, and the rotation speed command value $\omega^*$ is generated such that the rotation speed ($\omega_e$) of the motor 1 is decreased from the current rotation speed. Thus, in a condition in which the third inequality expression is true, regardless of the $\omega_0^*$, the $\omega^*$ is decreased forcibly.

Similarly to the first embodiment, the operation condition signal from the speed command adjustment unit 32 or a signal indicating that the restrictions are applied to the rotation speed command value $\omega^*$ is outputted to an external device (not shown) of the motor drive system.

When the number of the determination threshold value is one, it is sufficient to compare the $i\gamma^*$ and one determination threshold value ($TH_1$, $TH_2$, or their intermediate value). In this case, if the former is greater than or equal to the latter, the speed command adjustment unit 32 determines that the $i\gamma^*$ belongs to the normal range, and outputs the normal operation signal indicating that effect as the operation condition signal, and outputs the $\omega_0^*$ as the $\omega^*$ without change. On the other hand, if the former is less than the latter, it determines that the $i\gamma^*$ belongs to the protective range, and outputs the protective signal indicating that effect as the operation condition signal, and generates the rotation speed command value $\omega^*$ such that the rotation speed of the motor 1 does not increase from the current rotation speed or the rotation speed of the motor 1 is decreased from the current rotation speed.

By constructing the motor drive system as described above, the occurrence of the step-out can be prevented effectively. As described above in relation to the first embodiment, it becomes possible to perform the step-out prevention processing instantaneously. Moreover, the processing for the step-out prevention is performed by a comparison between the $i\gamma^*$ and a simple threshold value, and therefore, the processing burden is minor. Further, one processing can accommodate both the input voltage fluctuation and the load torque fluctuation.

Third Embodiment

Figure 12:
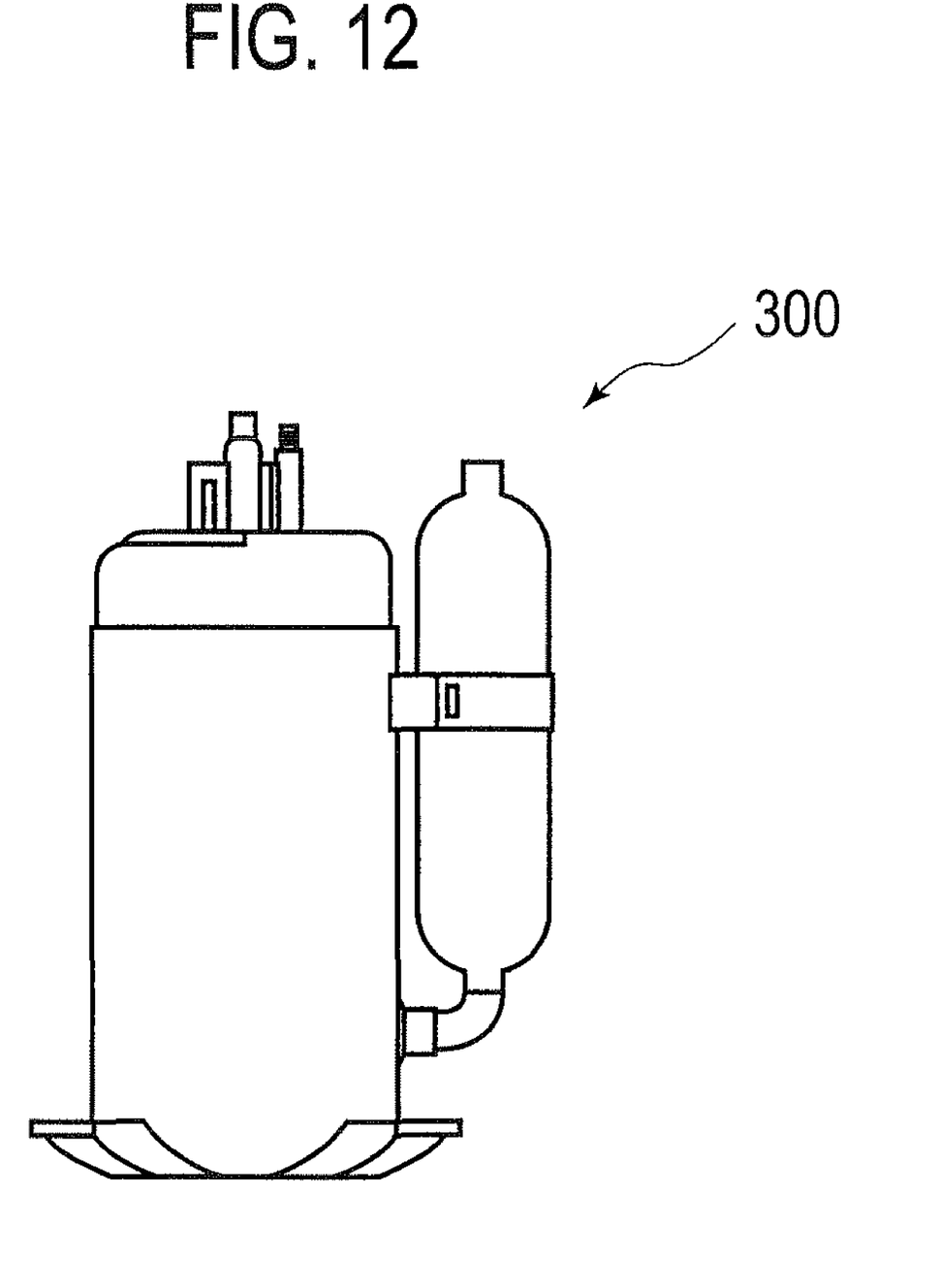
FIG. 12 is an outline view of a compressor to which the motor drive system of FIG. 5

As a device to which the motor drive system as shown in the first and second embodiments is applied, a compressor 300 is shown in FIG. 12. FIG. 12 is an outline view of the compressor 300. The motor drive system of the first embodiment or the second embodiment is provided to the compressor 300. The compressor 300 compresses refrigerant gas (not shown) using the torque of the motor 1 (the torque of the rotor 6 to be exact) as the drive source. The kind of the compressor 300 is arbitrary. For example, the compressor 300 may be a scroll compressor, a reciprocating compressor, or a rotary compressor.

Modifications

The following notes 1 to 6 are provided as the modifications of the above-described embodiments or the explanatory notes. The contents described in each of the notes can be combined arbitrarily as long as they are not contradictory.

[Note 1]

Although the rotation speed $\omega_e$ and the rotor position $\theta_e$ are derived by estimation in the above-described embodiments, they also can be derived based on an output signal of a rotor position sensor (such as a hall element or a resolver) that outputs a signal according to the rotor position.

[Note 2]

Although the U-phase current $i_u$ and the V-phase current $i_v$ are detected directly by using the phase current sensor 11 in the above-described embodiments, they also can be detected based on the DC current at the power source side of the inverter 2 (that is, the current that flows between the DC power source 4 and the inverter 2).

[Note 3]

The derivation method of all the values to be derived including the various command values (such as the $i\gamma^*$, the $i\delta^*$, the $v\gamma^*$, and the $v\delta^*$) and the state quantities (such as the $i\gamma$, and the $i\delta$) described above is arbitrary. That is, for example, they may be derived by computation within the motor control device (3a or 3b), or they may be derived from table data that are previously set.

[Note 4]

A part or all of the functions of the motor control device (3a or 3b) are achieved by using software (program) incorporated such as in a general microcomputer. When the motor control device is achieved by using the software, the block diagram showing the configuration of each part of the motor control device indicates a functional block diagram. Naturally, it also is possible to form the motor control device only with hardware rather than the software (program) or with a combination of the software and the hardware.

[Note 5]

For example, it can be considered as below. The voltage shortage determination unit 30 has a function to determine whether or not the supply voltage shortage is occurring, and also has a function as the speed command adjustment unit to adjust the rotation speed command value $\omega^*$ by controlling the speed command generation unit 31 through an output of the operation condition signal. Moreover, the voltage shortage determination unit 30 also has a function as the output unit to output the signal according to the comparison result between $i\gamma^*$ and the determination threshold value to the external device. In the second embodiment that corresponds to FIG. 11, the function of the output unit is achieved by the speed command adjustment unit 32.

Since the δ-axis current iδ is a current component involved in the torque of the motor 1, this can be called the torque current component of the motor current $I_a$. Since the γ-axis current iγ is a current component (excitation current component) for changing the interlinkage magnetic flux of the armature winding at the stator of the motor 1, this can be called the excitation current component of the motor current $I_a$. Corresponding to the above, the δ-axis current command value iδ* and the γ-axis current command value iγ* can be called the torque current command value and the excitation current command value respectively.

[Note 6]

In this specification, the following point should be noted. In the above formulas and the figures, the Greek alphabets (such as γ and δ) that are expressed as so-called subscript also can be expressed as standard letters that are not subscript. This difference between the subscript and standard letters of the Greek alphabets should be ignored. In other words, for example, $i_\gamma$ indicates the same thing as iγ, and $i_\delta$ indicates the same thing as iδ.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

What is claimed is:

1. A motor control device that vector-controls a permanent magnet synchronous type motor such that an excitation current component of a motor current supplied to the motor follows an excitation current command value, comprising:
   an excitation current command value derivation unit for deriving the excitation current command value according to rotation speed of the motor; and
   a determination unit for determining whether or not a supply voltage to the motor for driving the motor is running short based on the excitation current command value.

2. The motor control device of claim 1, wherein the determination unit includes a speed command value adjustment unit for adjusting a rotation speed command value the rotation speed is to follow based on a determination result of whether or not the supply voltage to the motor is running short.

3. The motor control device of claim 2, wherein the speed command value adjustment unit adjusts the rotation speed command value based on a comparison result between the excitation current command value and a predetermined determination threshold value.

4. The motor control device of claim 3, wherein the excitation current command value is classified into one of a plurality of numerical value ranges that do not overlap with each other,
   wherein the plurality of numerical value ranges include a normal range and a protective range, and
   wherein when the excitation current command value falls within the protective range, the speed command value adjustment unit adjusts the rotation speed command value such that the rotation speed does not increase or the rotation speed is decreased.

5. The motor control device of claim 4, wherein the protective range is categorized into first and second protective ranges that do not overlap with each other,
   wherein an absolute value of the value that belongs to the second protective range is greater than an absolute value of the value that belongs to the first protective range, and
   wherein when the excitation current command value falls within the first protective range, the speed command value adjustment unit adjusts the rotation speed command value such that the rotation speed does not increase, whereas when the excitation current command value falls within the second protective range, the speed command value adjustment unit adjusts the rotation speed command value such that the rotation speed is decreased.

6. The motor control device of claim 3, further comprising an output unit for outputting a signal in accordance with the comparison result between the excitation current command value and the determination threshold value to an outside of the motor control device.

7. A motor drive system, comprising:
   a permanent magnet synchronous type motor;
   an inverter for driving the motor by supplying a voltage for driving the motor; and
   the motor control device of claim 1 that vector-controls the motor through the inverter.

8. A compressor that utilizes the torque of the motor provided in the motor drive system of claim 7 as the drive source.

9. A motor control device that vector-controls a permanent magnet synchronous type motor such that an excitation current component of a motor current supplied to the motor follows an excitation current command value, comprising:
   an excitation current command value derivation unit for deriving the excitation current command value according to rotation speed of the motor; and
   a speed command value adjustment unit for adjusting a rotation speed command value the rotation speed is to follow based on the excitation current command value.

* * * * *